July 28, 1942.    T. W. PAUL    2,291,407
SLIP CLUTCH
Filed May 6, 1939    2 Sheets-Sheet 1
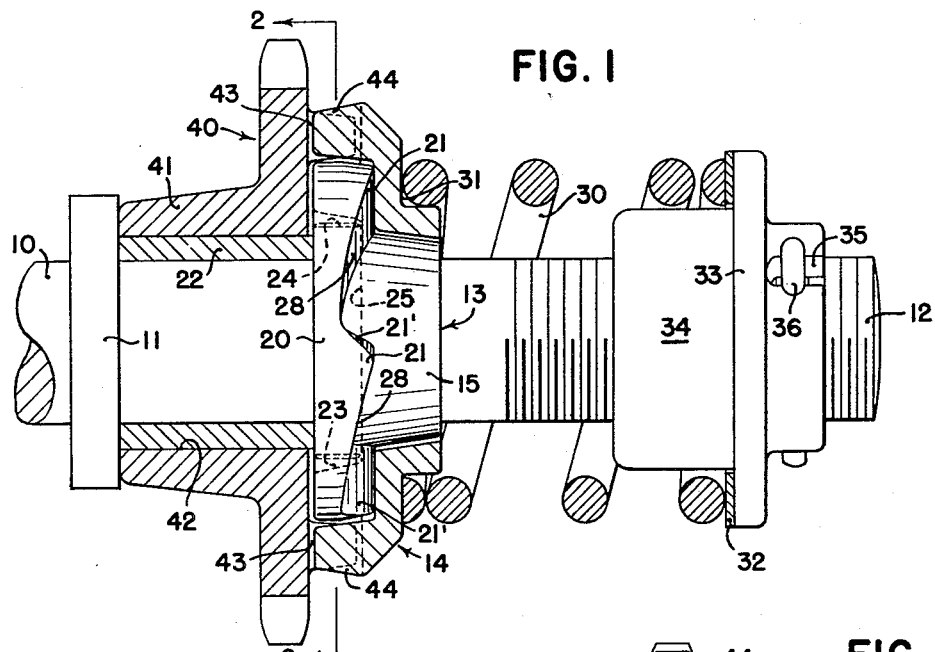
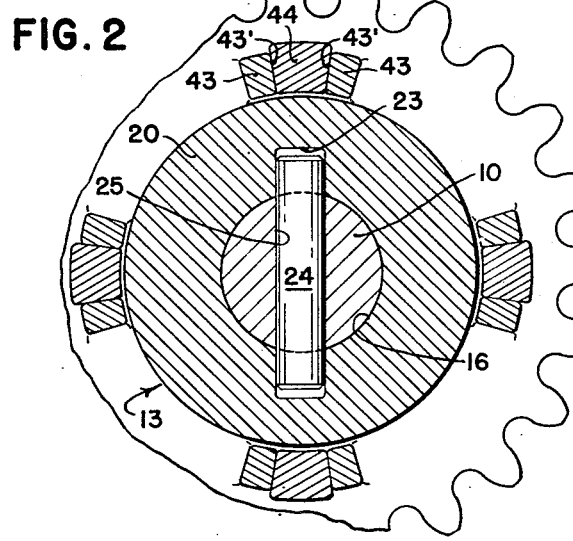
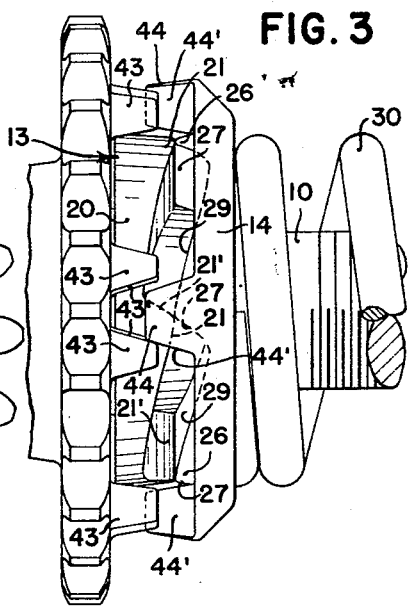
*INVENTOR*
TALBERT W. PAUL
BY
*ATTORNEYS*

July 28, 1942.  T. W. PAUL  2,291,407
SLIP CLUTCH
Filed May 6, 1939   2 Sheets-Sheet 2

*INVENTOR*
TALBERT W. PAUL
BY
*ATTORNEYS*

Patented July 28, 1942

2,291,407

UNITED STATES PATENT OFFICE 2,291,407

SLIP CLUTCH

Talbert W. Paul, Moline, Ill., assignor to Deere & Company, Moline, Ill., a corporation of Illinois Application May 6, 1939, Serial No. 272,111

9 Claims. (Cl. 64—29)

The present invention relates to slip clutches or safety releasing devices such as are commonly employed in power transmitting connections for the purpose of preventing damage to the driving or driven members should the driven mechanism become jammed or overloaded, and is in the nature of an improvement on the slip clutch shown and described in Letters Patent No. 1,942,217, granted to me on January 2, 1934. The principal object of the present invention is to provide a new and improved slip clutch capable of relatively fine adjustment and having an accurately controlled declutching action.

In the above patent it was pointed out that in the conventional form of slip clutch comprising a pair of interengaging clutching members or rosettes, one of which is fixedly secured to one of the transmission shafts and the other of which is slidable relative to the other transmission shaft, there is a considerable amount of frictional resistance to the sliding movement of the movable clutching member relative to its respective transmission shaft, and this frictional resistance varies inversely with the distance of the sliding surfaces from the center of rotation of the shaft. In the above patent, the frictional resistance is greatly lessened by removing the sliding surfaces a maximum distance from the center of the shaft, and while this had the effect of greatly improving the operation of the clutch, it was found that frictional resistance still exerted an appreciable influence on the releasing action of the clutch. Further, the frictional resistance to sliding movement between the movable clutch member and its respective transmission shaft was found to fluctuate between relatively wide limits under various running conditions, causing the clutch to release at various torque loads, sometimes appreciably greater than that for which the clutch was adjusted.

With the above in view, it is another object of the present invention to provide a slip clutch in which the effect of frictional resistance to sliding movement between the movable clutch member and its respective transmission shaft is eliminated. A more specific object of my invention is to provide a driving connection between the movable clutch member and its transmission shaft which imposes a component of the driving force in the direction in which it opposes the frictional resistance to movement of the clutch member away from its cooperative clutch member. In one embodiment of my invention, I accomplish these objects by connecting the movable clutch member to its associated power transmission member by means of coacting clutching elements having pressure faces disposed at an angle to the direction of driving force whereby a component of the driving force is transmitted to the clutching member and opposes the frictional resistance to relative sliding movement between pressure faces. By making the angle between the pressure faces and the direction of application of force substantially equal to the angle of friction, that is to say, the critical angle at which the camming effect of the inclined faces equals the frictional resistance, the latter is counteracted and therefore its effect is eliminated from the action of the slip clutch for any torque load.

In another embodiment of my invention, I provide a pivoted link driving connection between the longitudinally movable clutch member and one of the transmission members, whereby the two members are made to rotate together and are axially movable relative one to the other without a sliding driving connection therebetween. The effect of frictional resistance due to the movable clutch member bearing on its supporting shaft is counteracted by offsetting the link pivots axially in order to provide a component of the driving force in opposition to the frictional resistance.

Other objects and advantageous features will be apparent from the following description of the invention taken in connection with the accompanying drawings, in which:

Figure 1 is a partially sectioned side elevational view of one embodiment of my improved clutch;

Figure 2 is a transverse sectional view through the clutch, taken substantially along the line 2—2 of Figure 1;

Figure 3 is a side elevation of the clutch, showing the movable clutching member riding over the fixed clutching member at the instant of release;

Figure 4:
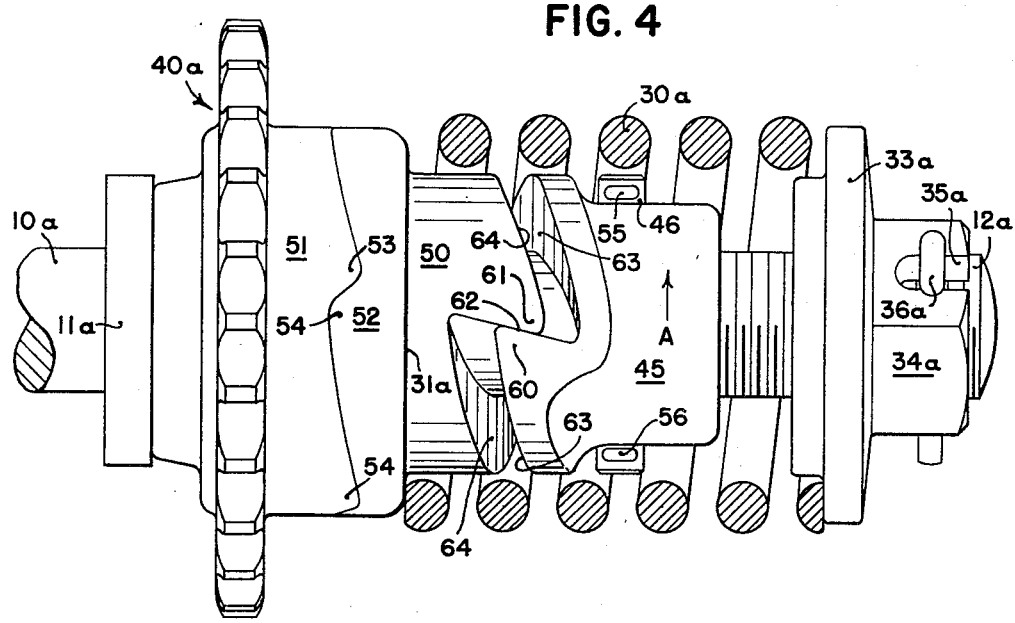
Figure 4 is a partially sectioned side elevation of a modified form of my improved slip clutch.

Referring now to the drawings, and more particularly to Figures 1–3, inclusive, my improved slip clutch is mounted on one of the transmission shafts 10 which may be either the driven member or driving member of the clutch, but which is preferably the driving member and is in the form of a cylindrical shaft having a radial flange 11 and a threaded end portion 12.

The clutch also comprises two clutching members or rosettes 13 and 14 which are carried by the shaft 10. The clutching member 13 consists of a sleeve or hub 15 having a central cylindrical opening 16 adapted to receive the shaft 10, and a shoulder 20 provided with a plurality of teeth or serrations 21 on the front face thereof providing a number of inclined clutching surfaces 21'. The back face of the shoulder 20 bears against one end of a spacer sleeve 22 that loosely embraces the shaft 10 and at its other end abuts against the flange 11. The back face of the shoulder 20 is also provided with a diametrically extending recess 23 which is adapted to receive a pin 24, the latter being passed through a diametrically extending hole 25 in the shaft 10 and serving to prevent the clutch member 13 from rotating relative to the shaft 10. The other clutching member or rosette 14 is journaled on the hub 15 of the member 13, and is slidably movable axially thereof. A slight taper is provided on the hub 15 and cooperating clutch member 14 to insure against binding. This clutching member also has teeth or serrations 26 (Figure 3) which are adapted to engage the teeth 21 on the clutching member 13. The clutch teeth 26 are provided with inclined clutching surfaces 27 which engage the corresponding surfaces 21' on the other clutch member 13, whereby the member 14 is driven by the member 13. In this connection, it will be noted from the drawings that each of the teeth 21 and 26 has a steeply angled driving face 21', 27 and a more gently sloping back face 28, 29, and that the latter faces are in the nature of spiral ramps which serve to gently return the clutch members to interengaging position.

The clutching member 14 is held in driving engagement with the clutching member 13 by means of a compression spring 30, one end of which bears against an annular shoulder 31 provided on the member 14. The opposite end of the spring 30 bears against a washer 32 which in turn bears against a flange 33 provided on a nut 34 which is screwed onto the threaded end 12 of the shaft 10. The front end of the nut 34 is slotted at 35 to receive a cotter pin 36, and the latter is passed through the slots and an aligned hole in the shaft 10 to lock said nut in any adjusted position along the threaded portion of the shaft within the range of the slot 35, as will be readily understood. With the cotter pin removed, the spring pressure, and hence the load at which the clutch will slip, can be adjusted by moving the nut in or out on the shaft 10.

The clutch member 14 has a driving connection, which will be described presently, with a transmission sprocket 40 that may be either the driving or the driven member of the clutch, but which preferably is the driven member. The sprocket 40 has a hub portion 41 provided with a central aperture 42, and is rotatably journaled on the spacer sleeve 22. The sprocket and hub are slightly shorter than the spacer sleeve 22, and therefore have a loose fit between the flange 11 and shoulder 20, said spacer sleeve taking the thrust exerted against the clutching member 13 by the spring 30.

The front face of the sprocket 40 is provided with several pairs of circumferentially spaced forwardly extending lugs 43 disposed outside of the clutching member shoulder 20. The adjacent faces 43' (see Figure 3) of each pair of lugs 43 diverge axially away from the sprocket, the purpose of which will be explained presently.

The clutching member 14 is also provided with a plurality of lugs or projections 44 arranged in a circle corresponding with the ring of lugs 43, each of said lugs 44 being adapted to fit between and engage with one of the pairs of lugs 43 to transmit rotary movement to the sprocket 40. The sides, or pressure faces 44' of the lugs 44 are sloped to correspond with the adjacent faces of the lugs 43 and are adapted for sliding movement relative thereto. The angle which the plane of contact between the lugs 43, 44 makes with respect to the line of force is substantially equal to the angle of friction, and consequently frictional resistance to relative sliding movement between the lugs 43, 44 is counteracted or opposed by the camming action thereof, tending to separate the clutch members. The lugs 43, 44 are made long enough so that they will not move out of engagement when the clutch slips and the clutch member 14 rides over the serrations of the rosette 13, as best shown in Figure 3.

The operation of my improved clutch is as follows: Power is transmitted from the driving shaft 10, through the rosette 13 to the clutching member 14, and thence through the lugs 43 and 44 to the driven sprocket 40. When the load on the sprocket exceeds the maximum for which the slip clutch is adjusted by the spring 30, the rosette or clutching member 14 is cammed forwardly out of engagement with the clutching member 13. During this forward movement of the clutching member 14 a sliding action occurs between the lugs 43 and the lugs 44. It is to be noted, however, that the points of contact between these lugs are at an appreciable distance from the centers of the driving shaft 10 and driven sprocket 40, as disclosed in my prior patent, and this, together with the effect of the inclined planes of contact 43', 44' between the lugs 43 and 44, substantially eliminates the effect of frictional resistance to such sliding movement upon the calibration of the clutch spring 30. It will be apparent, therefore, that the slip clutch can be more finely adjusted than has been possible heretofore, and that its declutching action will be more uniform and accurate due to the elimination of frictional resistance as an appreciable factor.

A modified form of my invention is shown in Figure 4, and such elements of this embodiment as are similar to those of the above described numerals with the suffix a.

Referring now to Figure 4, the slip clutch comprises a driving member 45, which is fixedly secured to the driving shaft 10a by a pin 46; an axially movable intermediate member 50, slidably journaled on the shaft 10a and operatively connected with the member 45 so as to rotate therewith; and a driven sprocket 40a which is rotatably journaled on the shaft 10a. Driving connection between the intermediate member 50 and the sprocket 40a is through rosettes or clutching sections 51 and 52, the latter being formed integral with the intermediate member 50, and the rosette 51 being formed integral with the sprocket 40a. As in the previously described embodiment, the rosettes 51, 52 have mating teeth 53, 54, respectively, and the axially movable clutching member 52 is held in engagement with the fixed clutching member 51 by means of a spring 30a bearing against a shoulder 31a on the member 50.

The driving member 45 is preferably a casting in the form of a sleeve adapted to embrace the shaft 10a, and is secured thereto by the pin 46 passed through aligned openings in the driving member and shaft. The pin 46 is held in place by means of cotter pins 55, 56 which are passed through holes in the ends of the pin. Clutch dogs 60 are provided on the end of the driving member 45, and engage mating clutch dogs 61 on the intermediate member 50.

The driving, or pressure faces of the clutch dogs 60, 61 slidably engage one another at 62 in a plane inclined to the line of force at an angle substantially equal to the critical angle of friction in the direction which sets up a force, when the clutch is under load, tending to separate the clutch members 51, 52. The back sides 63, 64 of the clutch dogs 60, 61, respectively, are spaced apart a distance slightly greater than the length of axial movement of the intermediate member 50 when the clutch is slipping, so as to allow the necessary axial movement while transmitting rotary movement to the intermediate member.

The operation of this embodiment of my invention is as follows: Power is transmitted from the driving shaft 10a which is rotating in the direction of the arrow A, through the driving member 45 and clutch dogs 60, 61 to the intermediate clutch member 50, and thence through the rosettes or clutching members 51, 52 to the driven sprocket 40a. When the load on the sprocket exceeds the maximum for which the slip clutch is adjusted by the spring 30a, the intermediate member 50 is cammed away from the rosette 52 and out of engagement therewith, causing the clutch dogs 61 to slide over the clutch dogs 60 of the driving member. As with the previously described embodiment, the points of sliding contact between the driving member 45 and intermediate member 50 are at an appreciable distance from the centers of both members as compared with the usual spline connection, and the pressure between the driving faces is reduced accordingly. Also, the inclination of the plane of contact between clutch dogs 60, 61 eliminates the influence of frictional resistance to sliding movement of the member 50 with respect to the driving member 45.

Figure 5:
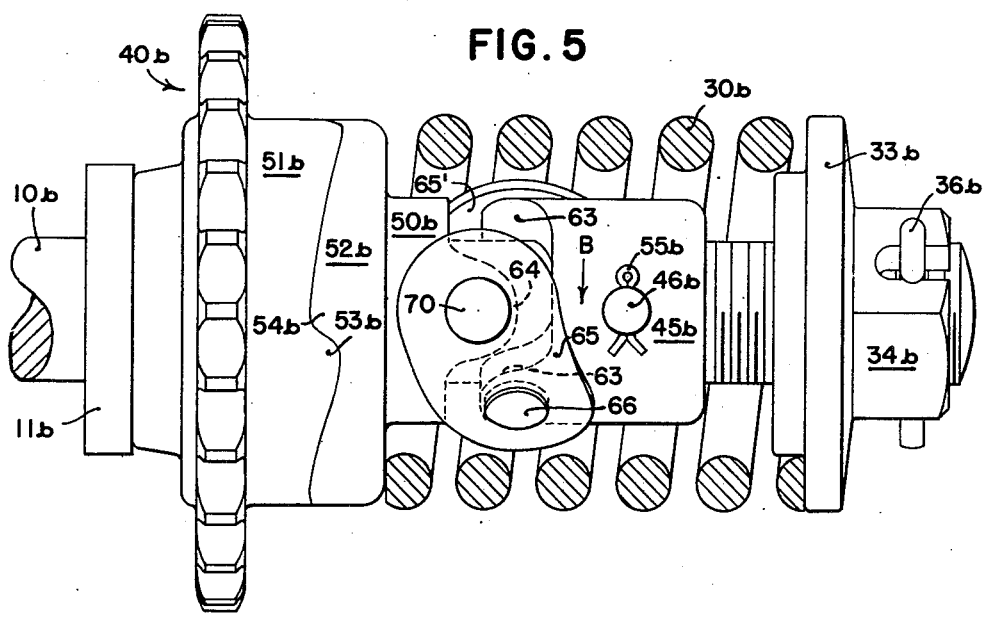
Figure 5 is a partially sectioned side elevation of a third form of my clutch.

Another embodiment of my invention is illustrated in Figure 5, and structural elements similar to those described in connection with the preceding constructions are given the same reference numerals with the suffix b.

Referring now to Figure 5, this form of my invention is seen to be generally similar to the construction shown in Figure 4, but differs therefrom in the manner of connecting the intermediate member 50b with the driving member 45b. The driving member 45b is provided with a pair of ears 63 disposed on opposite sides of the shaft 10b and extending in the direction of the intermediate member 50b. The adjacent end of the latter is likewise provided with a pair of ears 64 disposed on opposite sides of the shaft 10b and extending back in the direction of the driving member 45b. It will be noted in Figure 5 that the ear 64 trails rearwardly of the ear 63 with respect to the direction of rotation of the driving member 45b, indicated by the arrow B, and that the clearance between the members 45b and 50b is sufficient to allow for the necessary axial movement of the intermediate member 50b when the clutch is slipping.

A link 65 is pivotally connected at one end by a pin 66 to one of the ears 63, and at the other end by a pin 70 to the corresponding ear 64, said link being curved to follow the cylindrical surfaces of the members 45b and 50b. A similar link 65' is similarly connected on the opposite side of the shaft to the corresponding parts on that side. The link 65 fits loosely on the pins 66, 70 to allow for the fact that the axes of the pins are not parallel, and the links are held in place by the spring 30b which embraces them.

In this construction of my improved slip clutch, the shaft 10b and driving member 45b normally rotate in the direction of the arrow B, and power is transmitted to the intermediate member 50b through the links 65, 65' and thence to the driven sprocket 40b through the rosettes 51b, 52b. When the sprocket 40b is overloaded and the rosette 52b is cammed to the right by the rosette 51b, the intermediate member 50b moves back on the supporting links 65 against the pressure of the spring 30b. Inasmuch as the links 65, 65' are under tension while transmitting power, and the load, represented by the pins 70, is offset axially from the line of force applied through the pins 66, there is a tendency for the links to swing around so that the pins 70 trail directly behind the pins 66.

The frictional resistance afforded by this pivoted link connection to relative axial movement between the driving member and intermediate member is negligible, and its effect, as well as that of the sliding friction between the member 50b and the shaft 10b is counteracted by the tendency of the links 65 to swing the pin 70 over to a position trailing directly behind the pin 66.

What I claim as my invention is:

1. A slip clutch device comprising rotatable driving and driven power transmitting members, a pair of inter-engaging clutch members, one of said clutch members being fixed to one of said power transmitting members and the other clutch member being axially movable relative to the other power transmitting member between engaged and released positions, said clutch members having coacting teeth, and a spring for normally holding said clutch members in engagement and yieldable to permit the movable clutch member to be forced away from and out of engagement with said one clutch member when the slip clutch is overloaded, and a driving connection between the movable clutch member and said other power transmitting member comprising relatively slidable pressure faces disposed at the critical angle of friction with respect to a plane through the axis of rotation to apply a component of the driving force to said movable clutch member substantially equal to the frictional resistance to relative sliding movement between said pressure faces for eliminating the effect of said frictional resistance.

2. A slip clutch mechanism comprising, in combination, coaxial driving and driven power transmitting members, a pair of separable clutching members having mutually interengaging faces, one of said clutching members being fixedly secured to one of said power transmitting members, and the other of said clutching members being axially movable relative to the other power transmitting member between engaged and released positions, and a driving connection between said last mentioned clutching and power transmitting members comprising pairs of spaced lugs on one of the members, and complementary lugs carried by the other member engageable between said pairs of lugs and slidable relative thereto, said lugs having cooperating pressure faces disposed at the critical angle of friction with respect to the direction of driving force to apply an axial force on said movable clutch member eliminating the effect of frictional resistance to relative movement between said members.

3. A slip clutch mechanism comprising, in combination, a rotatable shaft, a power transmitting member rotatably journaled on said shaft, a pair of coacting clutch members, one of which is fixedly secured to said shaft adjacent said power transmitting member, and the other of which is disposed opposite the power transmitting member and is axially movable relative thereto between engaged and released positions, and a driving connection between said movable clutch member and said power transmitting member comprising inter-engaging lugs spaced radially outward from the outer periphery of said first named clutch member, said lugs having cooperating pressure faces disposed at an angle to the direction of driving force substantially equal to the critical angle of friction between the slidable members, whereby the effect of frictional resistance to relative movement between said members is substantially eliminated.

4. A slip clutch mechanism comprising a rotatable shaft, a driving member mounted on said shaft to rotate therewith, a driven member rotatably journaled on said shaft, and an intermediate member slidably mounted on said shaft between said driving and driven members, mutually interengaging clutch teeth provided on adjacent ends of said driven member and intermediate member, and coacting clutch dogs on the adjacent faces of said intermediate member and said driving member, said clutch dogs having pressure faces inclined to the line of driving force at an angle substantially equal to the angle of friction and in a direction whereby the effect of frictional resistance to relative sliding movement between clutch dogs is substantially eliminated.

5. A slip clutch device comprising a rotating drive shaft, a power transmitting member journaled for rotation relative thereto, a driving element fixed to the shaft, an annular member embracing said shaft and movable axially relative thereto, means connecting said annular member to said driving element, and second means connecting said annular member with said power transmitting member, one of said means comprising interengaging clutch teeth operative to move the annular member to a position of disengagement under excessive load, and the other of said means being disposed to transmit the driving torque to said annular member at an acute angle with respect to the plane of rotation to exert an axial force on the annular member substantially eliminating the frictional resistance to axial movement thereof.

6. In combination, rotatable driving and driven power transmitting members, a toothed annular clutch element fixed to one of said members, a second annular clutch element mounted for axial sliding movement relative to the other power transmitting member and having teeth on one end thereof adapted to engage with the teeth of said first named clutch element, said clutch teeth acting to move said second clutch member out of driving engagement with the other clutch member under excessive load, and means connecting the other end of said second annular clutch element to said other power transmitting member comprising portions having cooperating pressure faces disposed at an angle to the direction of force substantially equal to the angle of friction whereby frictional resistance to axial movement of said second clutch member is substantially eliminated.

7. A slip clutch mechanism comprising, in combination, rotary driving and driven power transmitting members, a pair of separable clutch members, one of said clutch members being fixedly secured to one of said power transmitting members, and the other of said clutch members being axially movable relative to the other power transmitting member between engaged and released positions, means operative to move said other clutch member to released position when the clutch is overloaded, and a driving connection between said other clutch member and said other power transmitting member comprising a lug on one of the members, and a complementary lug carried by the other member engageable with said first lug and slidable relative thereto, said lugs having cooperating pressure faces disposed at the critical angle of friction with respect to the direction of driving force to apply an axial force on said movable clutch member eliminating the effect of frictional resistance to relative movement between said members.

8. An overload slip clutch mechanism comprising in combination, a driving member and a driven member arranged for relative and for coadunative rotation about a common axis, an intermediate part mounted for rotation and for axial movement relative to both of said driving and driven members, companionate camming teeth on said intermediate part and on one of said members, a spring for yieldingly holding said intermediate part against said latter member with said teeth in driving contact, said camming teeth coacting to move said intermediate part axially away from said one driving member against the pressure of said spring when the clutch is overloaded, and a driving connection between said intermediate part and the other of said members accommodating said axial movement and providing for a limited rotational movement of said intermediate part relative to said other member during such axial movement, said driving connection being disposed to transmit the driving torque to said intermediate part at an acute angle with respect to the plane of rotation whereby an axial component of the driving force is applied to said intermediate part substantially equal to the frictional resistance to axial movement thereof, and in a direction tending to cancel the effect of such frictional resistance.

9. An overload slip clutch mechanism comprising in combination, a driving member and a driven member arranged for relative and for coadunative rotation about a common axis, an intermediate part mounted for rotation and for axial movement relative to both of said driving and driven members, companionate camming teeth on said intermediate part and on one of said members, a spring for yieldingly holding said intermediate part against said latter member with said teeth in driving contact, said camming teeth coacting to move said intermediate part axially away from said one driving member against the pressure of said spring when the clutch is overloaded, a substantially circumferentially extending link connecting said intermediate part to the other of said members for transmitting the driving force thereto, said link causing said intermediate part to rotate to a limited extent when the same moves axially to exert a force thereon substantially equal to the frictional resistance to axial movement and in a direction tending to eliminate the effect of such frictional resistance.

TALBERT W. PAUL.